United States Patent
Steinmann et al.

(10) Patent No.: US 9,688,525 B2
(45) Date of Patent: Jun. 27, 2017

(54) TANK SYSTEM

(71) Applicant: MAGNA STEYR Fuel Systems GesmbH, Sinabelkirchen (AT)

(72) Inventors: Dominik Steinmann, Stubenberg (AT); Patrick Zierler, Brodingberg (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 509 days.

(21) Appl. No.: 14/266,033

(22) Filed: Apr. 30, 2014

(65) Prior Publication Data
US 2014/0326724 A1    Nov. 6, 2014

(30) Foreign Application Priority Data
May 2, 2013  (EP) ..................................... 13166254

(51) Int. Cl.
| | | |
|---|---|---|
| F16L 25/01 | (2006.01) | |
| B67D 7/32 | (2010.01) | |
| B60K 15/01 | (2006.01) | |
| B60K 15/04 | (2006.01) | |
| F16L 33/22 | (2006.01) | |
| B60K 15/03 | (2006.01) | |

(52) U.S. Cl.
CPC ............ *B67D 7/3236* (2013.01); *B60K 15/01* (2013.01); *B60K 15/04* (2013.01); *F16L 25/01* (2013.01); *F16L 33/22* (2013.01); *B60K 2015/03381* (2013.01); *B60K 2015/03401* (2013.01); *B60K 2015/047* (2013.01)

(58) Field of Classification Search
CPC ......... F16L 33/22; F16L 33/227; F16L 25/01; B60K 15/04; B60K 2015/0458; B60K 2015/03401
See application file for complete search history.

(56) References Cited

U.S. PATENT DOCUMENTS

| | | | | |
|---|---|---|---|---|
| 1,974,635 | A * | 9/1934 | Weinke ................... | F16L 33/22 152/DIG. 7 |
| 3,038,744 | A * | 6/1962 | Boylan ................... | F16L 47/26 220/86.1 |
| 6,260,578 | B1 * | 7/2001 | Kuehnemund ........ | B60K 15/04 137/515.5 |

(Continued)

FOREIGN PATENT DOCUMENTS

| | | |
|---|---|---|
| CN | 101142104 | 3/2008 |
| DE | 199 15 373 A1 | 7/1998 |

(Continued)

OTHER PUBLICATIONS

Office Action and Search Report for Chinese Patent Application No. 201410174275.7, mailed Jan. 22, 2016, 9 pages including 5 pages of English translation.

*Primary Examiner* — David E Bochna
(74) *Attorney, Agent, or Firm* — Jordan IP Law, LLC; Todd A. Vaughn

(57) ABSTRACT

A tank system which prevents problems caused by electrostatic charging during a fueling sequence. The tank system includes a filling pipe, a filling hose which leads to a fuel tank, and a support sleeve, composed of an electrically conductive plastic material, in abutment with the filling pipe and the filling hose to thereby connect the filling pipe to the filling hose in an electrically conductive manner.

16 Claims, 2 Drawing Sheets

(56) References Cited

U.S. PATENT DOCUMENTS

| | | | |
|---|---|---|---|
| 6,719,330 B2* | 4/2004 | Brown | F16L 33/02 285/239 |
| 7,878,554 B2* | 2/2011 | Le Bars | F16L 37/0915 285/319 |
| 2001/0029994 A1* | 10/2001 | Brown | B60K 15/04 141/1 |
| 2002/0096882 A1 | 7/2002 | Strips | |
| 2002/0130515 A1* | 9/2002 | Mlyajima | F16L 47/28 285/201 |
| 2004/0201217 A1* | 10/2004 | Mobley | F16L 25/01 285/417 |
| 2005/0211311 A1* | 9/2005 | Gamble | B60K 15/04 137/590 |
| 2008/0129046 A1* | 6/2008 | Parker | B60K 15/04 285/305 |
| 2009/0078336 A1* | 3/2009 | Baudoux | B60K 15/04 141/311 R |
| 2009/0127805 A1* | 5/2009 | Benjey | B60K 15/04 277/627 |
| 2010/0101669 A1* | 4/2010 | Geurtz | B60K 15/04 137/592 |
| 2011/0284126 A1* | 11/2011 | Gamble | B60K 15/04 141/192 |
| 2015/0343898 A1* | 12/2015 | Kito | B60K 15/04 220/86.1 |
| 2016/0121715 A1* | 5/2016 | Dufendach | B60K 15/04 220/86.2 |

FOREIGN PATENT DOCUMENTS

| | | | | |
|---|---|---|---|---|
| DE | EP 1191268 A1 * | 3/2002 | | F16L 25/01 |
| DE | 10 2008 054247 A1 | 4/2010 | | |
| JP | EP 1024046 A2 * | 8/2000 | | B60K 15/04 |
| JP | 3647517 B2 | 5/2005 | | |

* cited by examiner

TANK SYSTEM

CROSS-REFERENCE TO RELATED APPLICATIONS

The present application claims priority 35 U.S.C. §119 to European Patent Publication No. EP 13166254.6 (filed on May 2, 2013) which is hereby incorporated by reference in its entirety.

TECHNICAL FIELD

Embodiments relate to a tank system which prevents problems caused by electrostatic charging during a fueling sequence. The tank system includes a filling pipe and a filling hose connected to the filling pipe, the filling hose leading to a fuel tank. The filling pipe and the filling hose serve to fill the fuel tank. Such tank systems are used in particular in motor vehicles.

BACKGROUND

It is known to connect filling pipes to a tank via a hose. German Patent Publication No. DE 10 2008 054 247 A1 discloses a fuel tank having a filling connector piece which is connected to a filling element which is arranged in the tank, the filling element comprising a flexible hose. The flexible hose may be secured to the filling connector piece by way of a clamping element.

For a filling pipe which is connected to a hose, it is also known to use at the inner side of the filling pipe a sleeve which supports the filling pipe so that it does not give way when the hose is secured to the filling pipe, for example, by way of a clip.

It is further known that the inner surface of a fuel hose which comprises plastics material may be electrostatically charged by way of the fuel flow. In order to prevent the occurrence of electrostatic problems, German Patent Publication No. DE 199 15 373 A1 uses a plastics fuel hose coupling for connecting a plastics fuel hose to a metal pipe which is earthed, the electrical resistance of the coupling member with respect to the specific surface resistance being between $10^6$ and $10^{10}$ Ohm.

SUMMARY

Embodiments relate to a tank system which, in a simplistic manner, prevents potential problems caused by electrostatic charging and which may be produced in a cost-effective manner.

In accordance with embodiments, a tank system may include at least one of: a filling pipe; a filling hose connected to the filling pipe, the filling hose leading to a fuel tank; a support sleeve to support the connection of the filling pipe to the filling hose, the support sleeve being produced from electrically conductive plastics material, the filling pipe and the filling hose being connected in an electrically conductive manner and the support sleeve being in abutment with both the filling pipe and the filling hose.

In accordance with embodiments there is provided an electrically conductive support sleeve which supports the connection location between the filling pipe and the filling hose and which at the same time is used to discharge electrical voltages via the filling hose and the filling pipe. The support sleeve is produced from plastics material and may consequently be formed in a simple and cost-effective manner so that it is in abutment with both the filling pipe and the filling hose in a highly electrically conductive manner.

In accordance with embodiments, a tank system may include at least one of: a filling pipe; a filling hose which leads to a fuel tank; and a support sleeve to establish an electrically conductive connection between the filling pipe and the filling hose, the support sleeve having a base member with tongues orientated radially outward and distributed circumferentially over the periphery of a first end of the base member, and ribs extending between adjacent tongues and which are orientated radially outward and distributed circumferentially over the periphery of the first end of the base member.

In accordance with embodiments, a tank system may include at least one of: a filling pipe; a filling hose which leads to a fuel tank; and a support sleeve, composed of an electrically conductive plastic material, in abutment with the filling pipe and the filling hose to thereby connect the filling pipe to the filling hose in an electrically conductive manner.

In accordance with embodiments, a tank system may include at least one of: a filling pipe; a filling hose which leads to a fuel tank; and a support sleeve, composed of an electrically conductive material, to establish an electrically conductive connection between the filling pipe and the filling hose, the support sleeve having a base member with: a first end having outwardly extending tongues to be received in and abut a radially inner side of the filling hose, and outwardly extending ribs between adjacent tongues; and a second end having a planar surface to be received by and abut a radial inner side of the filling pipe such that the ribs form a stop to axially position the support sleeve in the filling pipe.

In accordance with embodiments, the support sleeve may be radially in abutment at the inner side with both the filling pipe and the filling hose. The support sleeve may then be constructed in a particularly simple manner, in particular in a cylindrical manner.

In accordance with embodiments, the support sleeve may have at a first end thereof which faces the filling hose, a radially outward formation which is constructed to be in abutment with the filling hose at the radially inner side in order thus to ensure a secure electrically conductive contact with the inner side of the filling hose.

In accordance with embodiments, the formation is orientated obliquely backwards, towards the second end of the support sleeve. In spite of the tight abutment of the filling hose against the support sleeve, it is thereby possible to simply push the filling hose onto the support sleeve during production.

In accordance with embodiments, the formation is formed by a plurality of resilient tongues which are distributed over the periphery of the support sleeve. A secure contacting of the filling hose is thereby ensured, even when the filling hose swells, for example, under the influence of fuel, or expands as a result of high internal pressure, for example, in the case of pressure tanks.

For more simple positioning of the support sleeve on the filling pipe, support ribs may be arranged between the resilient tongues.

The support sleeve may be constructed in a planar manner at the second end thereof facing the filling pipe in order to be in radial abutment with the filling pipe at the inner side. Therefore, the support sleeve, with the exception of a formation at the end facing the filling hose, may form a simple cylinder.

In accordance with embodiments, at least one of the filling pipe and the filling hose may be provided at the radially inner side with an electrically conductive layer so that the filling pipe and/or the filling hose does not have to be constructed as a whole in an electrically conductive manner in order to ensure the conductivity of the components.

DRAWINGS

Embodiments are described hereinunder by way of example with reference to the drawings.

DESCRIPTION

Figure 1:
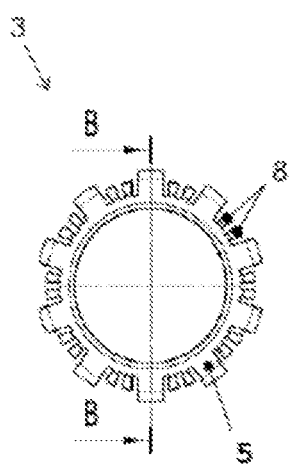
FIG. 1 illustrates a first end of a support sleeve of a tank system, in accordance with embodiments.
Figure 2:
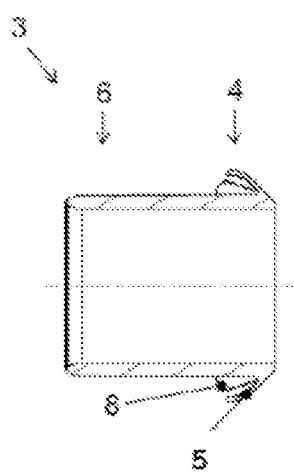
FIG. 2 illustrates a sectioned illustration in accordance with B-B of FIG. 1.
Figure 3:
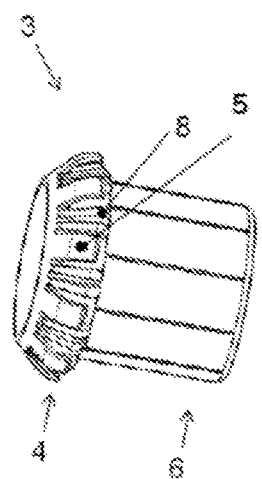
FIG. 3 illustrates a three-dimensional illustration of a support sleeve of FIGS. 1 and 2.

FIGS. 1-3 illustrate a support sleeve of a tank system in accordance with embodiments. The support sleeve 3 has a cylindrical base member composed of electrically conductive plastics material, and which has a formation 5 at a first end 4 thereof. The formation 5 is formed by a plurality of tongues distributed circumferentially in a regular manner over the periphery of the base member and which are orientated and radially outwards in an oblique backward direction, that is to say, in the direction towards a second end 6 of the support sleeve 3.

Arranged circumferentially between adjacent tongues of the formation 5 are smaller support ribs 8 which also protrude radially outwards in an oblique backward direction towards the second end 6 of the support sleeve 3. At the second end 6 thereof, the support sleeve 3 is constructed in a planar manner, and thus retains, its cylindrical shape.

Figure 4:
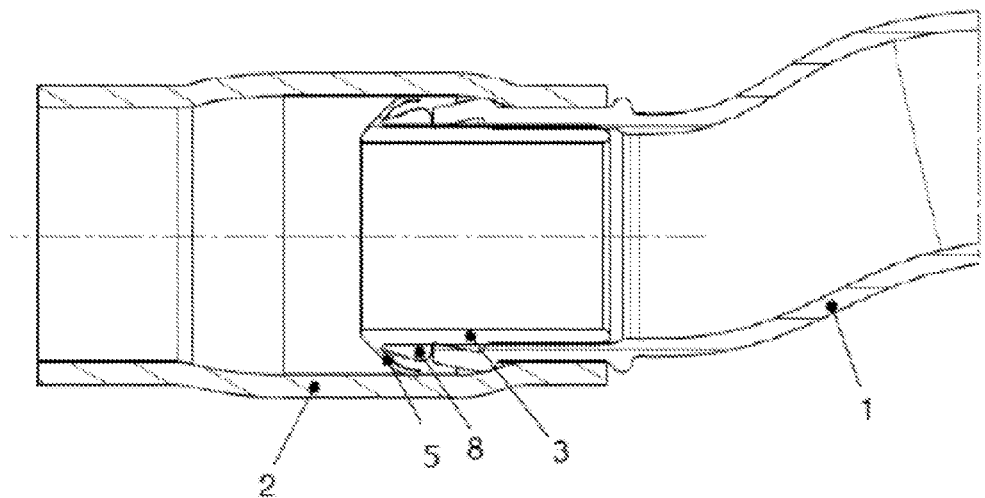
FIG. 4 illustrates a sectioned view of the support sleeve of FIG. 2 having a filling pipe and a filling hose.

As illustrated in FIG. 4, the cylindrical second end 6 of the support sleeve 3 may be inserted into or otherwise received by a filling pipe 1, the support ribs 8 forming a stop which axially positions the support sleeve 3 in the filling pipe 1. A filling hose 2 may be pulled over the support sleeve 3 and over an end portion of the filling pipe 1. Both the filling pipe 1 and the filling hose 2 are provided with an electrically conductive layer at respective inner sides. The outer side of the second end 6 of the support sleeve 3 is in abutment at the inner side of the filling pipe 1. The outer side of the first end 4 of the support sleeve 3, in particular, the outer side of the tongues of the formation 5 of the support sleeve 3, is in abutment at the inner side of the filling hose 2, even when the hose 2 is expanded in the contact region. A secure electrical connection is thereby produced between the filling pipe 1 and the filling hose 2 by way of the support sleeve 3.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should be not so limited since other modifications will become apparent to the skilled practitioner upon a study of the drawings, specification, and following claims.

LIST OF REFERENCE SIGNS

1 Filling pipe
2 Filling hose
3 Support sleeve
4 First end of the support sleeve
5 Formation
6 Second end of the support sleeve
8 Support rib

What is claimed is:

1. A tank system, comprising:
a filling pipe;
a filling hose which leads to a fuel tank; and
a support sleeve, composed of an electrically conductive plastic material, in abutment with the filling pipe and the filling hose to thereby connect the filling pipe to the filling hose in an electronically conductive manner, the support sleeve having at a first end thereof, a formation extending radially outward for abutment with the filling hose, the formation being orientated obliquely backwards, towards a second end of the support sleeve for receipt by the filling pipe,
wherein the formation has a plurality of resilient tongues which are circumferentially distributed over a periphery of the support sleeve, and support ribs arranged between adjacent resilient tongues.

2. The tank system of claim 1, wherein the support sleeve is in abutment at respective radial inner sides of the filling pipe and the filling hose.

3. The tank system of claim 1, wherein the second end has a planar surface configured for abutment with a radially inner side of the filling pipe.

4. The tank system of claim 1, wherein the support sleeve has a planar surface configured for abutment with a radially inner side of the filling pipe.

5. The tank system of claim 1, further comprising an electronically conductive layer at a radially inner side of the filling pipe.

6. The tank system of claim 1, further comprising an electronically conductive layer at a radially inner side of the filling hose.

7. The tank system of claim 1, further comprising a first electrically conductive layer at a radially inner side of the filling pipe and a second electronically conductive layer at a radially inner side of the filling hose.

8. A tank system, comprising:
a filling pipe;
a filling hose which leads to a fuel tank; and
a support sleeve to establish an electronically conductive connection between the filling pipe and the filling hose, the support sleeve having a base member with tongues orientated radially outward and distributed circumferentially over the periphery of a first end of the base member, and ribs extending between adjacent tongues and which are orientated radially outward and distributed circumferentially over the periphery of the first end of the base member.

9. The tank system of claim 8, wherein the base member has at a second end thereof, in a planar surface, the tongues and ribs extending towards the second end.

10. The tank system of claim 9, wherein the first end is configured for receipt in the filing hose such that the tongues abut a radially inner side of the filling hose.

11. The tank system of claim 9, wherein the second end is configured for receipt by and to abut a radial inner side of the filling pipe such that the ribs form a stop to axially position the support sleeve in the filling pipe.

12. The tanks system of claim 9, wherein:
the first end is configured for receipt in the filling hose such that the tongues abut a radially inner side of the filling hose; and
the second end is configured for receipt by and to abut a radial inner side of the filling pipe such that the ribs form a stop to axially position the support sleeve in the filling pipe.

13. The tank system of claim 8, further comprising an electrically conductive layer at the radially inner side of at least one of the filling pipe the filling hose.

14. A tank system, comprising:
a filling pipe;
a filling hose which leads to a fuel tank; and
a support sleeve, composed of an electrically conductive material, to establish an electrically conductive connection between the filling pipe and the filling hose, the support sleeve having a base member with:
a first end having outwardly extending tongues to be received in and abut a radially inner side of the filling hose, and outwardly extending ribs between adjacent tongues; and
a second end having a planar surface to be received by and abut a radial inner side of the filling pipe such that the ribs form a stop to axially position the support sleeve in the filling pipe.

15. The tank system of claim 14, further comprising a first electrically conductive layer at the radially inner side of the filling pipe.

16. The tank system of claim 15, further comprising a second electrically conductive layer at the radially inner side of the filling hose.

* * * * *